United States Patent Office 3,544,962
Patented Dec. 1, 1970

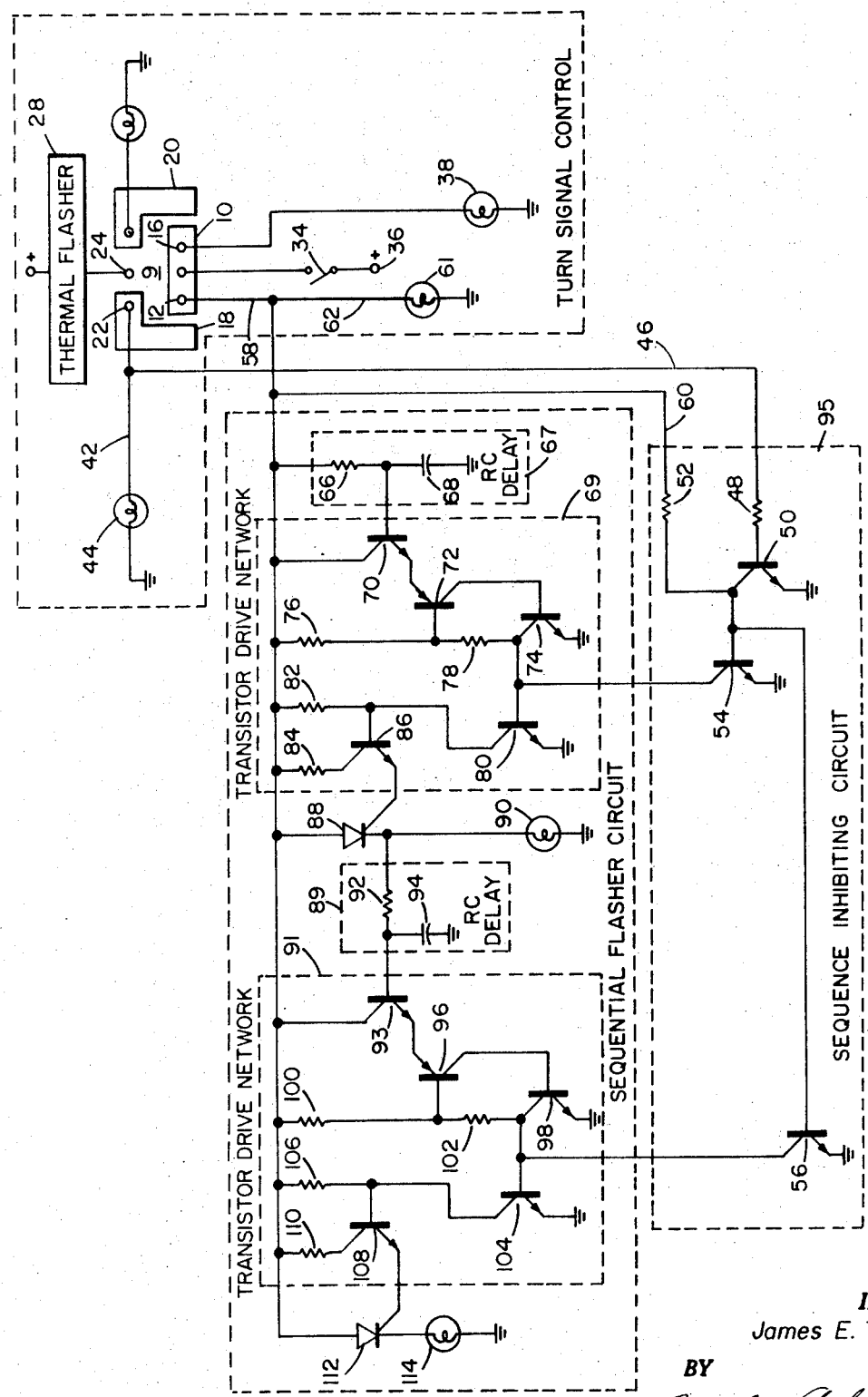

3,544,962
SEQUENTIAL LIGHT FLASHER
James Elbert Thompson, Scottsdale, Ariz., assignor to Motorola, Inc., Franklin Park, Ill., a corporation of Illinois
Filed Aug. 31, 1967, Ser. No. 664,856
Int. Cl. B60g 1/38; H03k 17/28
U.S. Cl. 340—67                    6 Claims

ABSTRACT OF THE DISCLOSURE

Disclosed is a sequential light flasher circuit which may be constructed in monolithic integrated form. The circuit, which is adapted for use in automobile turn signalling, includes a plurality of cascaded, resistance-capacitance time delay networks which are connectable via transistor and SCR drive circuitry to a corresponding plurality of turn lamps in an automobile. The time delay networks provide the sequential energization of the turn lamps in response to sequential charging of a capacitor in the resistance-capacitance time delay networks.

BACKGROUND OF THE INVENTION

This invention relates generally to sequential light flashers and more particularly to a light flasher circuit adapted for use in automobile turn signal circuitry and which may be primarily constructed in monolithic integrated form.

Prior art light flashing systems include mechanical motor-cam systems and discrete, digitally clocked systems which are not adaptable to integrated circuit construction. The motor-cam systems are inferior to an all-electric system from the standpoint of wear and failure of moving parts, and the all-electric digitally clocked systems are not equipped with duty cycle adjustment for the sequential flashing.

SUMMARY OF THE INVENTION

An object of this invention is to provide a new and improved sequential light flashing circuit which may be primarily constructed in monolithic integrated form.

Another object of this invention is to provide a sequential light flasher in which the duty cycle of the sequential flashing may be easily adjusted over a wide range.

Another object of this invention is to provide an improved monolithic integrated light flashing circuit operative to sequentially energize a set of turn lights and thereafter turn off all the lights simultaneously in order to begin a new cycle of flashing.

A further object of this invention is to provide an improved sequential light flashing circuit which may be used to control the flashing of the turn signals in many automobiles built today.

The present invention features sequential light flashing circuitry in combination with brake control circuits wherein the sequential flashing circuit is inhibited during braking, and the same electronic circuitry is used for sequential flashing and for braking, thereby eliminating duplication of electronic components.

Another feature of this invention is the provision of cascaded resistance-capacitance networks interconnected via transistor and SCR drive circuitry to a plurality of turn lamps in an automobile.

In the drawing:

The present invention is embodied in the single light flashing circuit illustrated in schematic diagram in the accompanying drawing.

DETAILED DESCRIPTION OF THE INVENTION

Referring in detail to the drawing, there is shown a switching mechanism 9 including a conductive plate 10 and movable conductive plates 18 and 20 which are adapted to be actuated by the movement of right and left-hand turn signal arms (not shown) in an automobile. The conductive plate 10 is used as a turn signal switch mechanism and a brake switch mechanism. The brake switching and the turn switching will be described in more detail in the following "Description of Operation" of the sequental light flasher circuitry.

The light flasher circuitry includes a first resistance-capacitance network 67 connected to a first transistor drive network 69, the latter being operative to apply a triggering signal to a first semiconductor controlled rectifier (SCR) 88. When rectifier 88 fires, an energizing current is passed through one of the turn lamps 90. A second resistance-capacitance network 89 is connected between the semiconductor controlled rectifier 88 and a second transistor drive network 91. The transistor drive network 91 is operative to trigger a second SCR 112 into conduction and provide energizing current to another of the turn lamps 114. A sequence inhibiting circuit 95 is operative to prevent sequential lamp flashing when all of the left-hand turn lamps 61, 90, and 114 are simultaneously energized during braking of an automobile. The remaining circuit components of the sequential light flasher circuitry in the drawing will be further identified below with reference to the description of circuit operation. This description relates only to the operation of the left-hand turn signal circuitry since the left and right-hand signal circuitry are identical.

DESCRIPTION OF OPERATION

Suppose that it is desired to make a left-turn signal in an automobile in which the present circuitry is used. When the turn signal arm (not shown) is moved in a downward direction, the L-shaped plate 18, constantly in contact with terminal 22, is moved into electrical contact with terminals 12 and 24. Conductive plate 10 is simultaneously moved to the right so that only terminal 16 can receive power from brake switch 34 and battery 36. An energizing potential is applied via conductor 46 to the base of control transistor 50 and also via conductor 60 and resistor 52 to the collector of transistor 50. These energizing potentials bias transistor 50 into saturation which in turn clamps the voltage at the bases of the first and second inhibiting transistors 54 and 56 to the $V_{CE(SAT)}$ of the control transistor 50. This voltage level is too low to bias the inhibiting transistors 54 and 56 into conduction and these latter transistors remain nonconducting during the sequential switching action to be further described.

Once the conductive plate 18 is moved into electrical contact with terminal 12, the left inboard turn lamp 61 is turned on to begin the sequential flashing. During the left-turn signaling, the L-shaped conductive plate 20 is moved to the right so that the right inboard lamp is not energized. When the conductor 58 is energized, capacitor 68 charges through resistor 66 until reaching a voltage sufficient to bias input transistor 70 into conduction. The input transistors 70 and 93 are included in the circuit between RC networks 67 and 89 and the transistors 72 and 96 to prevent current hogging from the RC networks 67 and 89, respectively. When transistor 70 is turned on, transistor 72 is driven into conduction to increase the turn on drive at the base of saturating transistor 74. The bias resistors 76 and 78 are connected to the transistor 72 to establish proper D.C. biasing, so that when device 72 becomes conductive, devices 72 and 74 are connected in a positive feedback loop, and device 74 is driven into saturation quickly.

Prior to the time that the saturating transistor 74 is driven into conduction and with the first and second inhibiting transistors 54 and 56 nonconducting, current flows through resistor 82 and into a first current sink transistor 80. The IR drop across resistor 82 maintains the base voltage of a first triggering transistor 86 at a level insufficient to bias the triggering transistor 86 into conduction and turn on a first SCR 88. However, when transistor 74 saturates, the voltage at the base of the current sink transistor 80 is dropped to $V_{CE(SAT)}$, a level insufficient to bias current sink transistor 80 conductive Consequently, as transistor 80 turns off, the voltage at the base of the triggering transistor 86 rises. When the voltage at the base of transistor 86 reaches a certain level, transistor 86 is biased into conduction to trigger the SCR 88 and provide an energizing current to the left center lamp 90.

With the first SCR 88 coducting, capacitor 94 charges through resistor 92 until it reaches a value sufficiently high to turn on a second input transistor 93 in the second transistor drive network 91. The switching action in the second transistor drive network 91 is similar to that in the first transistor drive network 69, and a second positive feedback loop consisting of transistors 96 and 98 furnishes the turn on drive to saturate transistor 98. When transistor 98 saturates, a second current sink transistor 104 is biased nonconductive and the voltage at the base of a second triggering transistor 108 rises to a level sufficiently high to turn the latter transistor on. When transistor 108 turns on, a second SCR 112 is triggered into conduction to furnish an energizing current for the left outboard lamp 114. The resistors 84 and 110 were included to limit the gate current applied via transistors 86 and 108 to the SCR's 88 and 112, respectively.

When the left outboard lamp 114 turns on, the current through the thermal flasher 28 is sufficient to cause a bimetal strip therein (not shown) to bend and momentarily open the circuit between the positive voltage supply and terminal 24. When this happens the SCR's 88 and 112 are turned off, and capacitors 68 and 94 discharge through transistors 70 and 93, respectively. When the bimetal strip cools, the cycle is repeated with the charging of capacitor 68 as previously described.

Thus, it is seen that the first and second resistance-capacitance networks 67 and 89 are sequentially charged in such a manner that the semiconductor controlled rectifiers 88 and 112 are fired at timed intervals determined by the RC time constants of the networks 67 and 89. These time constants can be adjusted by simply changing the resistor and capacitor values within the networks as is well known.

Suppose that it is now desired to provide a braking signal by closing the brake switch 34 to connect the positive potential at terminal 36 to the conductive plate 10. When switch 34 is closed to energize line 58 and with line 46 open, there is no base drive applied to control transistor 50 and the latter transistor is nonconducting. Now the potential at the bases of inhibiting transistors 54 and 56 is sufficiently high to bias these transistors into saturation. When transistors 54 and 56 conduct, the bases of current sink transistors 80 and 104 are clamped at $V_{CE(SAT)}$ and these transistors no longer conduct. Transistors 86 and 108 are simultaneously biased into conduction to fire the SCR's 88 and 112 and simultaneously light up the lamps 90 and 114, respectively. The right inboard lamp 38, which is also connected to the plate 10 at terminal 16, and the left inboard lamp 61 are turned on simultaneously with the left center lamp 90 and the left outboard lamp 114. The right center lamp and the right outboard lamp (not shown) are also turned on during braking and controlled by circuitry identical to that shown in the drawing.

If there is a simultaneous turning and braking action to energize the above-described circuitry, the signalling side turn lamps will continue to sequence since transistor 50 remains in saturation. However, the non-signalling turn lamps will all be lighted simultaneously since only the voltage at terminal 36 will be applied to the circuitry controlling the non-signalling side of the automobile.

The following table lists the values for a circuit of the type described which was actually built and successfully tested. However, these values should not be construed as limiting the scope of this invention.

TABLE

| Resistor (R): | | Value |
|---|---|---|
| 48 | ohms | 7,500 |
| 52 | do | 7,500 |
| 66 | do | 1,000,000 |
| 76 | do | 2,500 |
| 78 | do | 5,000 |
| 82 | do | 7,500 |
| 84 | do | 750 |
| 92 | do | 1,000,000 |
| 100 | do | 2,500 |
| 102 | do | 5,000 |
| 106 | do | 7,500 |
| 110 | do | 750 |
| Capacitor (C): | | |
| 68 | Microfarads | .1 |
| 94 | do | .1 |
| SCR 88 | | 2N4441 |
| SCR 112 | | 2N4441 |

When the circuit described above is constructed in monolithic integrated form, it has been found convenient to separate the one megohm resistors 92 and 66 and the two capacitors 68 and 94 from the remaining transistors and resistors in the circuit. This preference is because of the present limitation on capacitor and resistor size when constructing these components in monolithic integrated circuits. Also, it is preferred to use discrete component SCR's 88 and 112 rather than incorporate these devices into an integrated circuit. However, the remaining components which are shown in the drawing, with the exception of the lamps, have been fabricated as a monolithic integrated circuit on a single chip of semiconductor material, thus minimizing the space required by the flasher circuit in an automobile or other vehicle.

I claim:

1. A light flasher circuit including in combination, switching means, a resistance-capacitance network comprising a series connection of a resistor and a capacitor, means for connecting a source of energizing potential by way of said switching means across said resistance-capacitance network whereby said capacitor is charged to a predetermined potential upon closing said switching means, a transistor drive network including a pair of regeneratively connected transistors whereby when one of said pair of transistors is rendered conductive, the other of said pair is driven into saturation, means for applying the potential appearing across said capacitor to said one of said pair of transistors to render it conductive, a controlled rectifier having main electrodes and a control electrode, a signal lamp connected in series with a main electrode of said controlled rectifier, means to apply firing potential to the control electrode of said controlled rectifier in response to said second transistor becoming saturated, a second resistance-capacitance network connected to said first named controlled rectifier and including a second capacitor which is chargeable to a predetermined voltage, means responsive to the charging of said second capacitor and connected to a second lamp in said flasher circuit to energize said second lamp a predetermined time after the first lamp is energized, including a second transistor drive circuit connected to said second resistance-capacitance network and including a second saturating transistor which is rapidly driven into saturation when said second capacitor discharges; said responsive means further including, a second controlled rectifier coupled to said second transistor drive circuit and connected to said second lamp for energizing same when said second controlled rectifier is fired upon discharging of said second capacitor, said first transistor drive circuit including a first current sink transistor connected to said first named saturating transistor and conductively controlled thereby, said first transistor drive circuit further including a first triggering transistor connected between said first named controlled rectifier and said first current sink transistor for firing said first named controlled rectifier when said first current sink transistor is turned off by said first named saturating transistor, said second transsitor drive circuit including a second current sink transistor connected to said second saturating transistor, and a second triggering transistor connected between said second controlled rectifier and said second current sink transistor and turned on to fire said second controlled rectifier when said second current sink transistor is turned off by said second saturating transistor.

2. The light flasher circuit as defined in claim 1 which further includes:
  (a) a first inhibiting transistor connected to said first current sink transistor for biasing said first current sink transistor nonconductive when said first inhibiting transistor is conducting,
  (b) a second inhibiting transistor connected to said second current sink transistor for biasing said second current sink transistor nonconductive when said second inhibiting transistor is conducting,
  (c) a brake switch, and
  (d) means for controlling the conductance of said first and second inhibiting transistors to bias same into conduction, thereby simultaneously firing said first and second controlled rectifiers respectively and energizing said lamps in response to said brake switch.

3. The light flasher circuit defined in claim 2 wherein said controlling means includes a control transistor connected at its input electrode to one energizing potential and connected at its output electrode to another energizing potential so that when both the input and the output electrodes of the control transistor are energized, the control transistor is in its saturated condition and clamps the input voltage at said first and second inhibiting transistors; said control transistor rendered nonconductive when only one potential is applied thereto and unclamps said first and second inhibiting transistors to bias same into conduction and fire said first and second controlled rectifiers.

4. A signal circuit including
a switching means,
a resistance-capacitance network having a predetermined time constant and comprising a resistor and a capacitor connected in series,
means for connecting a source of energizing potential by way of said switching means across said resistance-capacitance network whereby said resistance-capacitance network is charged to a predetermined potential upon closing said switching means,
a signal,
a drive circuit means comprising an input transistor,
a connection from said resistance-capacitance network to said input transistor,
said drive circuit also including a pair of transistors connected to said input transistor and also connected in feedback arrangement with respect to each other for driving one of said pair of transistors into saturation when said capacitor is charged to said predetermined potential,
means including said drive circuit to turn said signal on,
a current sink transistor connected to said saturating transistor and conductively controlled thereby,
a controlled rectifier included in said last named means, and
a triggering transistor connected between said current sink transistor and said controlled rectifier and biased into conduction to fire said controlled rectifier, thereby providing energizing current to said signal.

5. The signal circuit as defined in claim 4 which further includes
an inhibiting transistor connected to said current sink transistor for clamping said current sink transistor nonconductive when said inhibiting transistor is biased into conduction, and
means for controlling the conductivity of said inhibiting transistor so that said current sink transistor may be biased nonconductive to raise the voltages at said triggering transistor and fire said controlled rectifier.

6. The signal circuit as defined in claim 5 where said means for controlling includes a control transistor having input and output electrodes connected to sources of energizing potential and operatively biased nonconductive when only a single energizing potential is applied thereto to unclamp said inhibiting transistor, said single energizing potential being of sufficient magnitude to bias said inhibiting transistor into conduction to turn on said signal, said control transistor biased conductive when a second energizing potential is applied thereto to clamp said inhibiting transistor at the saturation voltage of said control transistor.

References Cited
UNITED STATES PATENTS

| | | | |
|---|---|---|---|
| 3,022,467 | 2/1962 | Leeder | 315—209 X |
| 3,076,123 | 1/1963 | McDermott | 340—251 X |
| 3,099,962 | 8/1963 | Smith | 307—41 |
| 3,113,293 | 12/1963 | Breese et al. | 340—83 |
| 3,251,030 | 5/1966 | Bolton et al. | 340—41 |
| 3,313,981 | 4/1967 | Kratochvil | 315—210 |
| 3,391,304 | 7/1968 | Fabry | 340—83 |
| 3,398,399 | 8/1968 | Brock | 340—82 |
| 3,025,415 | 3/1962 | Clapper | 307—293 X |
| 3,162,772 | 12/1964 | Smith | 307—293 X |
| 3,207,962 | 9/1965 | Slusher. | |
| 3,427,512 | 2/1969 | Mapother. | |
| 3,456,131 | 7/1969 | Adem | 340—82 X |

OTHER REFERENCES

SCR Manual, 4th Edition 1967, Semiconductor Products Department, General Electric Company, Syracuse, N.Y., pp. 7, 86, 87, 169, 170.

THOMAS B. HABECKER, Primary Examiner

K. N. LEIMER, Assistant Examiner

U.S. Cl. X.R.

307—252, 293; 340—82